This invention relates to the manufacture of rod-like articles of twisted plastic material such as non-fibrous regenerated cellulosic material and more particularly to an improved apparatus and method for manufacturing such articles.

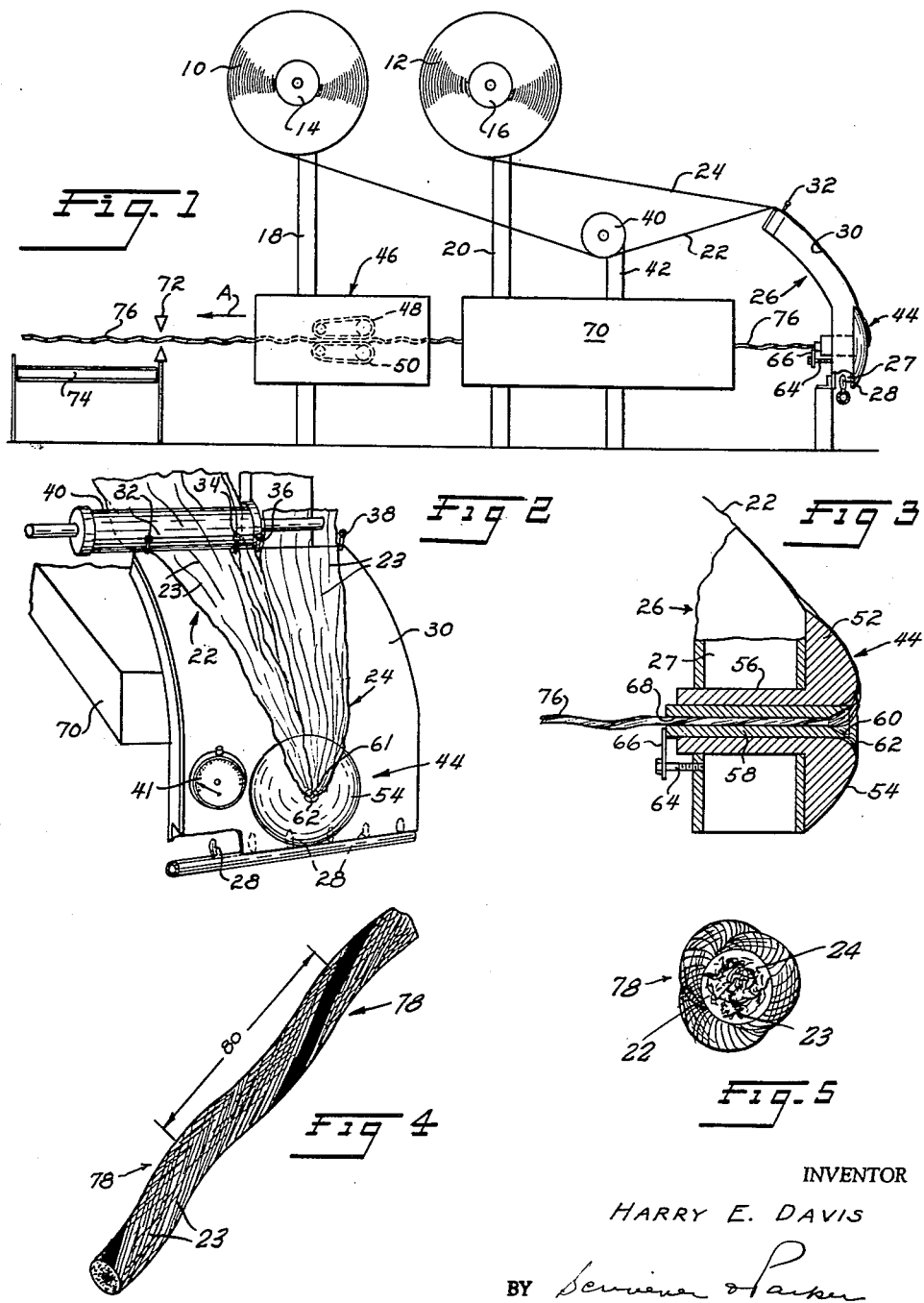
Dec. 3, 1963     H. E. DAVIS     3,112,604
TWISTED PLASTIC STICKS
Original Filed June 2, 1958
INVENTOR
HARRY E. DAVIS
ATTORNEYS 3,112,604
TWISTED PLASTIC STICKS
Harry E. Davis, 510 E. Cuyahoga Falls Ave., Akron, Ohio
Original application June 2, 1958, Ser. No. 739,258, now Patent No. 3,001,354, dated Sept. 26, 1961. Divided and this application Dec. 30, 1960, Ser. No. 79,759
2 Claims. (Cl. 57—154)

In my prior Patent No. 2,488,272 granted November 15, 1949, there is described a method for making from non-fibrous regenerated cellulosic material, hereinafter referred to as "cellophane," substantially rigid and moisture-proof stick-like articles of manufacture having a variety of uses, for example, lollipop handles, beverage stirrers and the like. In the method disclosed in the patent, a plurality of adhesively coated cellophane ribbons or strips are tightly twisted together to first form a rope-like flexible strand which is wound upon supply reels. Thereafter, the strand from each supply reel is subjected to heat, pressure and tension to form the substantially rigid finished articles. More particularly, the strand is passed around grooved heated rollers under tension and during this operation, the adhesive coatings on the strips are activated so that the strips are sealed together and compacted to obtain a substantially rigid stick-like material having a substantially homogeneous dense and solid cross-section. After cooling, the material is cut into convenient lengths for use.

While the method disclosed in the patent has been found in practice to produce the desired product, it has been found that such method may be simplified and improved by heating approximately the entire area of one or more strips of material capable of becoming adhesive when heated, then twisting and drawing the material under tension through a heated die to compact the material and seal the folds of the strip or strips together, and finally, cooling the material and cutting the same into lengths convenient for use. The improved and simplified process is continuous and avoids the necessity of first forming the strand material and thereafter subjecting such material to the action of heat, tension and pressure as disclosed in the patent. Other features and advantages of the improved process will become apparent as the description of the invention proceeds.

It is accordingly one of the objects of the present invention to provide an improved and simplified method of manufacturing sticks of the type above described.

Another object is the provision of an improved and continuous method of manufacturing sticks from an adhesively coated cellophane strip or strips wherein the strips are heated to activate the adhesive thereon as they are aggregated and twisted together to form a strand, following which the strand is further heated and compacted while it is being drawn under tension through a heated die.

A further object is to provide a continuous method of the above type wherein plastic strips which are self-adhesive when heated are drawn over a curved or arcuate heated surface as they are aggregated to form the strand material, and wherein the material is twisted as it is drawn under tension through a heated die and thereafter cooled to form the compacted and substantially rigid final product.

Another object is to provide an improved machine for practicing the method referred to above.

A further object is to provide a novel substantially rigid article of the above type wherein the plastic strips are effectively interlocked and adhesively sealed together and wherein the elongated article is formed as a helix having a definite pitch which is related to the linear travel of the strand material as it is simultaneously heated and twisted.

Other objects and novel features of the invention will appear more fully hereinafter from the following detailed description when taken in connection with the accompanying drawing illustrative of one form of the invention. It is to be expressly understood, however, that the drawing is utilized for purposes of illustration only and is not to be taken as a definition of the limits of the invention, reference being had for this purpose to the appended claims.

In the drawing, wherein similar reference characters refer to similar parts throughout the several views:

FIG. 1 is a side view of an apparatus which may be employed in practicing the improved method of manufacturing cellophane sticks in accordance with the present invention:

FIG. 2 is a perspective view of a portion of the apparatus of FIG. 1 and shows the cooperation between the cellophane strips and the heated surface member, the die holder and the die during the simultaneous heating and twisting of the strips;

FIG. 3 is a partial sectional view of the die holder and die;

FIG. 4 is an enlarged view of a portion of the finished cellophane stick, and

FIG. 5 is an end view of the stick of FIG. 4, the twisted strips being diagrammatically illustrated.

Referring more particularly to FIG. 1, an apparatus for practicing the novel method of the present invention is illustrated therein as including one or more supply reels 10 and 12 of cellophane strip material, the reels being freely rotatably mounted on spindles 14 and 16 which in turn are supported on standards 18 and 20. The strips 22 and 24 are fed to a combined heating and die member 26 which in effect is a hollow heating chamber 27 provided with an open top and an open bottom, the latter having suitable heating means such as gas burners 28 associated therewith in order to heat the chamber and parts thereof. It will be understood that the strips are coated with a suitable adhesive, such as a polymer of polyvinylidene chloride or a paraffin wax and nitrocellulose mixture so as to be self-sealing when heated, as well known in the art. As shown, the front face 30 of the member 26 is of metal and is formed as a curved or arcuate surface. The strips 22 and 24 are drawn over the face 30 in contact therewith, the said strips being guided in their travel by suitable guide pins 32, 34, 36 and 38. Preferably, the strips 22 and 24 are fed to the face 30 of the heating member 26 in such a manner that substantially the entire areas thereof are in contact with such face throughout the travel of the strips thereover, and the reels 10 and 12 are so positioned as to secure this action. If desired, one or more idler rollers 40, rotatably mounted on standards 42 may be provided so that the strips contact the face 30 as they travel over the latter. A suitable temperature indicator 41 may be mounted on the face 30 so that the operator will be able to maintain the member 26 and parts associated therewith at the proper temperature.

One of the features of the present invention resides in the simultaneous bunching, folding and twisting of the heated strips 22 and 24 and the drawing of such twisted strips under tension through a heated die mechanism 44. This is accomplished by a combined twisting and drawing apparatus 46, which may be of any suitable type.

In such an apparatus a pair of traveling belts 48 and 50 are frictionally engaged with the stick material to draw the latter in the direction of the arrow A, FIG. 1, and these belts are simultaneously rotated about the axis of the stick material to effect a twisting and folding of the strips 22 and 24 to form the tightly twisted strand material which is transformed into the substantially rigid rod-like material wherein the strips are interlocked and adhesively sealed together.

As shown, the die mechanism 44 includes a die holder 52 provided with a mushroom-shaped or arcuate outer head 54 and a hollow shank 56 for receiving a tubular die 58. The outer end of the die 58 is provided with an entrance cone 60 which may have an included angle of the order of 60° and in the form illustrated, the position of the cone 60 with respect to the rounded opening 62 of the die holder 52 may be adjusted by manipulation of the adjusting screw 64 which is threaded into the rear plate of the heating member 26 and carries a lug 66 which engages the rear end of the die 58. It will be understood that with such an arrangement, the die 58 and the die holder 52 as well as the face 30 will be heated by the burners 28 to a degree such that the adhesive coatings on the cellophane strips 22 and 24 will be activated as the latter are drawn over the face 30 and bunched and twisted together at the entrance cone 60 and drawn through the die 58. Preferably, the bore 68 of the die 58 is but a few thousandths of an inch larger than the diameter of the finished stick material. Thus the die offers an appreciable resistance to the passage of the twisted and heated strips as the latter are twisted and drawn through the die, thereby tensioning the material as it is compacted and heated.

Interposed between the die mechanism 44 and the apparatus 46 is a cooling chamber 70 which may be supplied with cooling air for cooling the stick material and thereby accelerating the setting of the adhesive which seals the tensioned and compacted cellophane strips to each other and together. Upon emerging from the cooling chamber 70, the stick material possessses a substantially dense, solid and circular cross section; is substantially rigid and rod-like, and may be cut into convenient lengths by a cutter 72 to fall upon a suitable conveyor 74.

In operation, and during initial starting of the cycle, it will be understood that the strips 22 and 24 must first be threaded by hand through the die mechanism 44, the cooling chamber 70 and the apparatus 46. The operation of the latter is then initiated to cause the travel of the strips over the face 30 and the twisting and drawing of the strips as above described, it being seen from FIG. 2, that during such travel a plurality of folds 23 are formed in each strip. As soon as the burners 28 are lit and the face 30 and die mechanism 44 are heated sufficiently to activate the adhesive coatings on the cellophane strips, the latter are bunched and tightly twisted together and ahesively sealed in an inter-locked condition to form the substantially rigid and rod-like material 76 after it passes under tension through the die 58 and the cooling chamber 70. After cutting the material into convenient lengths, as by means of the cutter 72, it is ready for use.

FIG. 4 is an enlarged view of a finished cellophane stick 78 and therefrom it will be seen that in addition to being formed of one or more twisted cellophane strips which are sealed together under tension, the stick is formed as a helix having a definite pitch indicated at 80. This formation is secured in the following manner. It will be recalled, see FIGS. 2 and 3, that during operation, the twisting of the cellophane strips 22 and 24 is commenced just prior to the entry of the heated strips into the entrance cone 60 of the die 58. Thus the strips become bunched together as shown at 61, FIG. 2. As the strips are drawn over a portion only of the entire circumference of the curved outer surface 54 of the die holder 52, and such strips approach the entrance cone 60 at an angle to the axis of the die 58, variable and unequal stresses will be set up in the strips as they are twisted together and drawn under tension through the die. No helical form is apparent in the stick material while the latter is closely confined within the bore 68 of the die 58. However, as soon as the stick material 76 emerges from the die, the helical form illustrated in FIGS. 3 and 4 is asserted and is apparent. This is due to the unequal and variable stresses imparted to the heated cellophane strips as they are twisted and tensioned and also due to the plastic naturet of the heated cellophane material. In the method, as practiced, it has been found that the pitch 80 is substantially equal to the linear advance of the stick material 76 per revolution of the apparatus 46. Thus the pitch may be varied in accordance with the speed of rotation of the apparatus 46 and the speed of travel of the belts 48 and 50.

It has also been found in practice that the diameter of the helix of the cellophane stick 78 may be varied by adjusting the position of the entrance cone 60 of the die 58 with respect to the opening 62 of the die holder 52. Thus, as the screw 64 is adjusted to move the die 58 further to the right, as viewed in FIG. 3, the diameter of the helix will be increased. Conversely, the helix diameter will be decreased as the die 58 is moved to the left in FIG. 3 to bring the entrance cone 60 further into the rounded opening 62.

In addition to the foregoing, it has been found that when the strips of material 22 and 24 are arranged to contact the heated surface 54 over the entire circumference thereof prior to twisting thereof and passage through the die 58, the resultant stick material is straight and possesses no helical form. This is due to the fact that no unequal or variable stresses are imparted to the heated strips as they are twisted and tensioned prior to and during passage thereof through the die 58.

While only two supply reels 10 and 12 have been illustrated in the drawing, it will be understood that several reels may be utilized, in which case additional spacing pins similar to pins 32, 34, 36 and 38 will be provided for guiding the cellophane ribbons over the heated face 30 to the heated die mechanism 44. It will also be understood that electric or any suitable heating means may be utilized for heating the member 26 in lieu of the burners 28 illlustrated.

This application is a division of my application Serial Number 739,258 filed June 2, 1958, now Patent No. 3,001,354 dated September 26, 1961.

It will be readily understood from the foregoing that the invention provides a novel mechanism and novel method for forming cellophane sticks of novel construction, it being understood that cellophane sticks of helical form present a pleasing appearance and provide more effective stirring rods in the mixing of beverages when used, for example, in the manner of swizzle sticks.

While the invention has been shown and described herein with considerable particularity, it will be readily understood that a wide variety of modifications may be resorted to. For example, the invention is not limited to the use of regenerated cellulosic plastic material but may be employed with any of the well-known sheet plastic materials wherein a strip or strips of such materials are capable of being adhesively secured together under the application of heat and during twisting and tensioning of such strip or strips in the manner above described. Other modifications may occur to those skilled in the art, all within the purview of the appended claims.

What is claimed is:

1. An article of manufacture, comprising at least one strip of tightly twisted and folded regenerated cellulosic material, the folds of the strip being adhesively secured together to form a substantially rigid rod-like material having an elongated helical form possessing substantially the same pitch throughout the length thereof and having a substantially dense, circular and solid cross-section.

2. An article of manufacture, comprising a plurality of strips of tightly twisted and folded plastic materials adhesively secured together, the folds of the individual strips being adhesively secured together to form a substantially rigid rod-like material having a substantially dense and solid cross-section and being formed as an elongated helix having substantially the same pitch throughout the length thereof.

References Cited in the file of this patent

UNITED STATES PATENTS

| | | |
|---|---|---|
| 1,995,696 | Wallach | Mar. 26, 1935 |
| 2,255,887 | Katz | Sept. 16, 1941 |
| 2,884,757 | Davis | May 5, 1959 |